(12) United States Patent
Choi et al.

(10) Patent No.: US 12,425,182 B2
(45) Date of Patent: Sep. 23, 2025

(54) APPARATUS AND METHOD WITH HOMOMORPHIC ENCRYPTION

(71) Applicant: SAMSUNG ELECTRONICS CO., LTD., Suwon-si (KR)

(72) Inventors: Rakyong Choi, Suwon-si (KR); Andrey Kim, Suwon-si (KR); Yongwoo Lee, Suwon-si (KR); Maksim Deriabin, Suwon-si (KR); Jieun Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 18/524,573

(22) Filed: Nov. 30, 2023

(65) Prior Publication Data

US 2024/0313944 A1    Sep. 19, 2024

(30) Foreign Application Priority Data

Mar. 17, 2023    (KR) .................. 10-2023-0035315

(51) Int. Cl.
 *H04L 29/06*    (2006.01)
 *H04L 9/00*    (2022.01)
 *H04L 9/30*    (2006.01)

(52) U.S. Cl.
 CPC ............ *H04L 9/008* (2013.01); *H04L 9/3093* (2013.01)

(58) Field of Classification Search
 CPC ..... H04L 9/008; H04L 9/3093; H04L 9/0861; H04L 63/0428; H04L 9/08; H04L 2209/04
 See application file for complete search history.

(56) References Cited

U.S. PATENT DOCUMENTS

| | | | |
|---|---|---|---|
| 11,374,736 B2 * | 6/2022 | Gao | H04L 9/3093 |
| 2015/0237020 A1 * | 8/2015 | Rohloff | H04L 63/0428 |
| | | | 713/168 |
| 2022/0271922 A1 | 8/2022 | No et al. | |

(Continued)

FOREIGN PATENT DOCUMENTS

| | | |
|---|---|---|
| EP | 4 096 148 A1 | 11/2022 |
| KR | 10-2022-0120410 A | 8/2022 |

OTHER PUBLICATIONS

Brenner et al., "performing homomorphic encryption by generating ciphertext using key switching operation and a secret key", 5th IEEE International Conference on Digital Ecosystems and Technologies (IEEE DEST 2011), May 31-Jun. 3, 2011, Daejeon, Korea (Year: 2011).*

(Continued)

*Primary Examiner* — Morshed Mehedi
(74) *Attorney, Agent, or Firm* — NSIP Law

(57) ABSTRACT

An apparatus and method with homomorphic encryption are provided. A method for performing a homomorphic encryption operation may include generating a second ciphertext, having a second total number of dimensions, by performing a key switching operation using a key-switching key to generate the second ciphertext, encrypted by a second secret key, based on a homomorphic encrypted first ciphertext on a first modulus encrypted by a first secret key, where the first ciphertext has a first total number of dimensions, and (Continued)

generating a ciphertext on a second modulus by performing a blind rotation operation based on the second ciphertext and an operation key.

20 Claims, 8 Drawing Sheets

(56) References Cited

U.S. PATENT DOCUMENTS

| | | | |
|---|---|---|---|
| 2022/0376890 A1 | 11/2022 | Eom et al. | |
| 2023/0188320 A1* | 6/2023 | Park | H04L 9/0618 380/28 |
| 2025/0158802 A1* | 5/2025 | Lam | G06N 3/048 |

OTHER PUBLICATIONS

Gentry, Craig et al., "Homomorphic Encryption from Learning with Errors: Conceptually-Simpler, Asymptotically-Faster, Attribute-Based," Advances in Cryptology—Crypto 2013: 33rd Annual Cryptology Conference, Jun. 8, 2013, (25 Pages in English).

Ducas, Léo, et al., "FHEW: Bootstrapping Homomorphic Encryption in Less Than a Second," Annual International Conference on The Theory and Applications of Cryptographic Techniques, 2015, (18 Pages in English).

Chillotti, Ilaria, et al., "TFHE: Fast Fully Homomorphic Encryption over The Torus," Journal of Cryptology, 2020, (62 Pages in English).

Xu, Runhua et al., "Privacy-Preserving Machine Learning: Methods, Challenges and Directions", arXiv:2108.04417v2, Sep. 22, 2021, (40 Pages in English).

Kim, Audrey et al., "General Bootstrapping Approach for RLWE-based Homomorphic Encryption," Samsung Advanced Institute of Technology, Sep. 27, 2021, (28 Pages in English).

Lee, Yongwoo et al., "Efficient FHEW Bootstrapping with Small Evaluation Keys, and Applications to Threshold Homomorphic Encryption," Samsung Advanced Institute of Technology, Oct. 11, 2022, (28 Pages in English).

Li, Ruiqi, et al, "Homomorphic Modular Reduction and Improved Bootstrapping for BGV Scheme." Information Security and Cryptology: 17th International Conference, Inscrypt 2021, Oct. 18, 2021 (19 pages).

Extended European search report issued on Aug. 23, 2024, in counterpart European Patent Application No. 24163817.0 (7 pages).

* cited by examiner

APPARATUS AND METHOD WITH HOMOMORPHIC ENCRYPTION

CROSS-REFERENCE TO RELATED APPLICATIONS

This application claims the benefit under 35 USC § 119(a) of Korean Patent Application No. 10-2023-0035315, filed on Mar. 17, 2023, in the Korean Intellectual Property Office, the entire disclosure of which is incorporated herein by reference for all purposes.

BACKGROUND

1. Field

The following description relates to an apparatus and method with homomorphic encryption.

2. Description of Related Art

Ducas et al. (2014) ("FHEW: Bootstrapping Homomorphic Encryption in Less Than a Second"), proposed a fully homomorphic encryption (FHE) technique called Fastest Homomorphic Encryption in the West (FHEW), for quick simple bit operations with refresh (bootstrapping). In the field of encryption, homomorphic encryption may enable arbitrary operations to be performed on or between encrypted data without decrypting the encrypted data. Homomorphic encryption is lattice-based and thus resistant to quantum algorithms and may be considered a safe form of encryption.

A blind rotation operation technology may be used to perform arbitrary function operations on ciphertext messages in the homomorphic encryption and may provide accuracy for operation results, but has the disadvantage that the size of a public key is significantly large.

Additionally, although various blind rotation operation techniques exist, a blind rotation operation still requires a lot of memory, and the amount of computation greatly increases when the size of a public key necessary for a homomorphic encryption operation is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method for performing a homomorphic encryption operation includes generating a second ciphertext, having a second total number of dimensions, by performing a key switching operation using a key-switching key to generate the second ciphertext, encrypted by a second secret key, based on a homomorphic encrypted first ciphertext on a first modulus encrypted by a first secret key, where the first ciphertext has a first total number of dimensions, and generating a ciphertext on a second modulus by performing a blind rotation operation based on the second ciphertext and an operation key.

The second total number of dimensions may be less than the first total number of dimensions, and the second modulus may be greater than the first modulus.

The key-switching key may be based on a scaled up version of the first secret key.

The performing of the blind rotation operation may include generating a result of a summation of respective products of each element of the second ciphertext and the operation key, and generating a result of a product of the result of the summation and an initial function that may be determined based on the key-switching key.

The key switching key may be based on a scaled up error corresponding to the key switching operation.

The second secret key may be a sub-vector of the first secret key.

The method may further include receiving the key-switching key, the operation key which may be dependent on the second secret key, and a ring learning with errors (RLWE) ciphertext as the first ciphertext, where the RLWE ciphertext may correspond to the RLWE ciphertext having been generated from data set for performing a homomorphic encryption operation.

The second ciphertext may be a second learning with errors (LWE) ciphertext, the method may further include performing a homomorphic rounding operation on the RLWE ciphertext, and generating a first LWE ciphertext having the first total number of dimensions based on a result of the homomorphic rounding operation, and the generating of the second ciphertext may include generating the second ciphertext by performing the key switching operation on the first LWE ciphertext.

The ciphertext on the second modulus may be a RLWE ciphertext, and the second modulus may be greater than the first modulus.

In one general aspect, embodiments include a non-transitory computer-readable storage medium storing instructions that, when executed by a processor, configure the processor to perform any one, any combination, or all operations and/or methods described herein.

In one general aspect, a processor-implemented method for homomorphic encryption, the method includes receiving a first secret key of a first ciphertext having a first total number of dimensions and a second secret key for a second ciphertext having a second total number of dimensions less than the first total number of dimensions, generating a key-switching key configured to generate the second ciphertext based on the first ciphertext and the first secret key, generating an operation key, based on the second secret key, configured to generate bootstrapping blind rotation results with respect to a homomorphic encryption operation that is dependent on the key-switching key, and outputting the key-switching key and the operation key.

The generating of the key-switching key may include scaling up the first secret key, and generating the key-switching key based on the scaled up first secret key.

The generating of the key-switching key may include scaling up an error used corresponding to a use of the key-switching key to perform a key-switching operation, and generating the key-switching key based on the scaled up error.

In one general aspect, an apparatus may include a processor configured to generate a second ciphertext, having a second total number of dimensions, through performance of a key switching operation that uses a key-switching key to generate the second ciphertext, encrypted by a second secret key, based on a homomorphic encrypted first ciphertext on a first modulus encrypted by a first secret key, where the first ciphertext has a first total number of dimensions, and generate a ciphertext on a second modulus by performing a blind rotation operation based on the second ciphertext and an operation key.

The second total number of dimensions may be less than the first total number of dimensions, and the second modulus may be greater than the first modulus.

The key-switching key may be based on a scaled up version of the first secret key.

For the performing of the blind rotation operation, the processor may be further configured to generate a result of a summation of respective products of each element of the second ciphertext and the operation key, and generate a result of a product of the result of the summation and an initial function that may be determined based on the key-switching key.

The key switching key may be based on a scaled up error corresponding to the key switching operation.

The second secret key may be a sub-vector of the first secret key.

The apparatus may further include a receiver to receive the key-switching key, the operation key which may be dependent on the second secret key, and a ring learning with errors (RLWE) ciphertext on the first modulus as the first ciphertext, where the second ciphertext may be a second learning with errors (LWE) ciphertext, the processor may be further configured to perform a homomorphic rounding operation on the RLWE ciphertext and generate a first LWE ciphertext having the first total number of dimensions based on a result of the homomorphic rounding operation, and, for the generation of the second ciphertext, the processor may be configured to generate the second ciphertext through performance of the key switching operation on the first LWE ciphertext.

Other features and aspects will be apparent from the following detailed description, the drawings, and the claims.

Figure 1A:
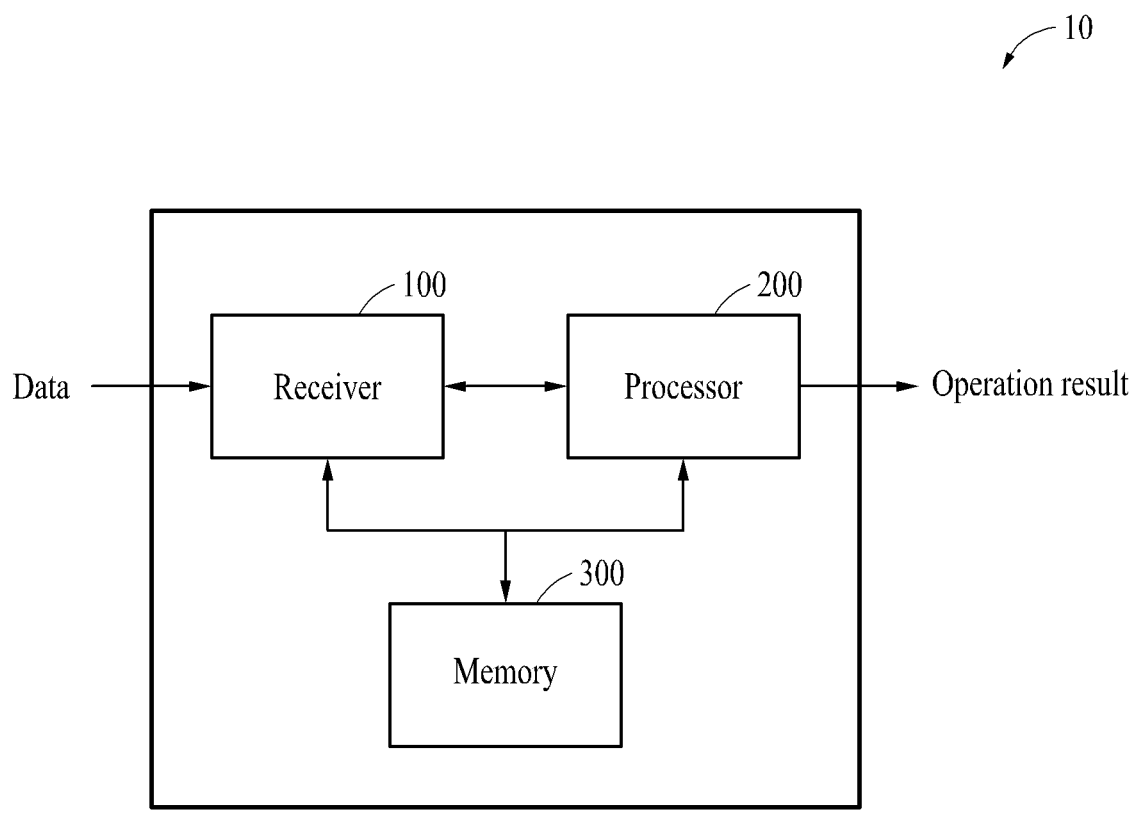
FIG. 1A illustrates an example computing apparatus with homomorphic encryption, according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

FIG. 1A illustrates an example computing apparatus with homomorphic encryption, according to one or more embodiments.

Referring to FIG. 1A, among other operations of the computing apparatus 10, the computing apparatus 10 may perform homomorphic operations on encrypted information, e.g., in a ciphertext form. The computing apparatus 10 may also perform encryption and/or decryption of information based on corresponding homomorphic encryption approaches. Homomorphic encryption may refer to a method of encryption configured to allow various homomorphic operations to be performed on information, while it is encrypted. As non-limiting examples, a homomorphic operation may include the multiplication of encrypted information, as a ciphertext, or between respective encrypted information, e.g., the ciphertext and one or more other ciphertexts, an addition of the respective encrypted information, and/or a scaler value, non-scaler information, variable, or function multiplied with, or added to, the encrypted information or both of the respective encrypted information, while that information is still encrypted. The result of such various homomorphic operations being performed on the encrypted information or the respective encrypted information, respectively generated through homomorphic encryption, may be a new ciphertext that is different from the ciphertext or the other ciphertext the homomorphic operations were performed on. When this new ciphertext is decrypted, the resulting plaintext form of the decrypted information is desirably the same as if the corresponding multiplication, addition, etc., operations were performed on the original information that was encrypted to generate the ciphertext or the other ciphertext.

Hereinafter, for explanative purposes, encrypted information or encrypted text may be referred to as a ciphertext. The ciphertext may be in the form of a polynomial or a vector including a polynomial, for example.

In one or more examples, the computing apparatus 10 may perform a ring learning with errors (RLWE) problem-based homomorphic encryption operation. In one or more examples, the computing apparatus 10 may perform an RLWE problem-based homomorphic encryption operation that supports the performance of an operation on a ciphertext resulting from an encryption of a plaintext that includes a binary number, for example. In one or more examples, the computing apparatus 10 may also or alternatively perform an RLWE problem-based homomorphic encryption operation that supports the performance of an operation on a ciphertext resulting from an encryption of a plaintext that includes an integer. Still further, in one or more examples, the computing apparatus 10 may also or alternatively perform an RLWE problem-based approximate homomorphic encryption operation that supports the performance of an operation on a ciphertext that results from an encryption of a plaintext that includes a real number and/or a complex number.

The computing apparatus 10 may perform an operation, i.e., a homomorphic operation, on a ciphertext and may perform a bootstrapping operation for the homomorphic encryption operation. In various examples herein, bootstrapping operation may include a bootstrapping operation that does not use an approximate polynomial operation or a bit extraction operation in the bootstrapping operation process compared to previous approaches that use an approximate polynomial operation or a bit extraction operation in a bootstrapping operation process. The example bootstrapping operations herein may provide higher accuracy than previous bootstrapping approaches and may have no limit on message size. Bootstrapping operations may also be referred to as modulus refresh operations.

The computing apparatus 10 may perform an example blind rotation operation (e.g., including a lookup table (LUT) operation) as described in greater detail below. The computing apparatus 10 may perform the example blind rotation operation using a smaller total number of ring-GSW (RGSW) operations than previous blind rotation approaches in previous homomorphic encryption approaches. Examples include the computing apparatus 10 performing homomorphic operations with respect to one or more ciphertexts, including the bootstrapping operations described in greater detail below, for all existing homomorphic encryption approaches that include blind rotation operations. For example, the computing apparatus 10 may perform TFHE (an FHE encryption approach 'over the Torus') and FHEW using the example blind rotation operations.

The computing apparatus 10 may have no restriction on the parameter size (e.g., number of parameters of a corresponding parameterized ciphertext, referred to as the dimension of the ciphertext) compared to previous approaches and, in one or more examples, may provide efficient homomorphic operation through a small-sized public key by dividing an original ciphertext into multiple ciphertexts having small dimensions (e.g., smaller dimensions than the dimension of the original ciphertext).

The computing apparatus 10 may perform a homomorphic operation on ciphertexts, i.e., ciphertexts resulting from respective plaintexts encrypted into various forms by existing homomorphic encryption approaches, as a non-limiting example.

The computing apparatus 10 may perform an encryption process of encrypting input data in privacy-preserving machine learning (PPML) and application services. In one or more examples, the computing apparatus 10 may be used in an encryption process of encrypting an input value in PPML and application services.

The computing apparatus 10 may be implemented in the form of a chip and mounted on a hardware accelerator that utilizes homomorphic encryption. In an example, the computing apparatus 10 may include only a processor 200, or a processor 200 and one or both of a receiver 100 and a memory 300. The computing apparatus 10 may be implemented in the form of a chip or through hardware (e.g., processor 200) and computer-readable instructions stored in memory 300, for reducing memory usage of various computing apparatuses 10, such as the computing apparatus 10 or another computing apparatus 10 that may correspond to the operation processor 120 discussed below with respect to FIG. 1B. In an example, the computing apparatus 10 may reduce the amount of computation for homomorphic encryption operations compared to previous approaches, thereby reducing the overall computational demand on a server (e.g., such as when the computing apparatus 10 is, or is included in, an example server).

In an example, the computing apparatus 10 may be applied to any RLWE problem-based homomorphic encryption and may be used to efficiently replace existing homomorphic operations that require RGSW operations and perform various non-polynomial functions, and may also provide high cryptographic stability through adjusting of the size of a secret key.

The computing apparatus 10 may be implemented in an encryption process of encrypting an input value in all devices and services that apply homomorphic encryption.

In a non-limiting example, the computing apparatus 10 may be implemented in a personal computer (PC), a data server, and/or a portable device.

The portable device may be a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be a smartwatch, a smart band, or a smart ring.

In a non-limiting example, the receiver 100 may include a receiving hardware interface. The receiver 100 may receive data for performing a homomorphic encryption operation from the outside and/or from the memory 300. The data may include operand data and/or a key for performing a homomorphic encryption operation. The key may include a private key and a public key, and the public key may include, for example, a key-switching key for a key switching operation, an operation key for a blind rotation operation, and/or the like, but examples are not limited thereto. The receiver 100 may provide/output or transmit the received data to the processor 200, or the processor 200 may directly receive the data without use or inclusion of the receiver 100.

As will be described in greater detail below, the processor 200 may perform a key switching operation on a ciphertext of a first dimension (e.g., an N dimension, where N is a natural number) to generate a ciphertext having a second dimension (e.g., an N' dimension, where N' is a natural number less than N) that is smaller than the first dimension, and may perform a blind rotation operation in the same state where the dimension is reduced. The processor 200 may reduce the amount of computation of the client and the server, required storage space, and communication traffic compared to previous approaches, for example.

The processor 200 may process data stored in the memory 300. The processor 200 may execute computer-readable code (e.g., computer-readable instructions, which may include various instruction forms, such as in firmware, software, programs, or other forms) stored in the memory 300 and other instructions triggered by the processor 200. The example computer-readable instruction may include instructions for controlling and/or performing an operation of the processor 200, an operation of various components of the processor 200, an operation by the receiver 100, an operation by the memory 300, and/or operations of a device the computing apparatus 10 may be included in, as non-limiting examples.

The processor 200 may be a data processing device implemented by hardware including a circuit having a physical structure to perform one or more or all operations or methods described herein. In a non-limiting example, such operations may be implemented by execution of the computer-readable code by the processor 200, which thereby configures the processor to perform one or more or all operations and/or methods described herein. The processor 200 may also or alternatively include hardware including circuitry that is configured to perform some or all of such operations without execution of such computer readable code.

The processor 200 may include, as non-limiting examples, a microprocessor, a central processing unit (CPU), a processor core, a multi-core processor, a multiprocessor, an application-specific integrated circuit (ASIC), and/or a field-programmable gate array (FPGA).

The processor 200 may perform a blind rotation operation based on a ciphertext having a second dimension and an operation key.

The processor 200 may perform a key switching operation, e.g., to generate the ciphertext having the second dimension from the ciphertext having the first dimension, based on a key-switching key in which a secret key of the ciphertext having the first dimension is scaled up.

The processor 200 may perform a multiplication operation between each element of the ciphertext having the second dimension and the operation key, perform an addition operation between the results of the multiplication operation, and perform a multiplication operation between a result of the addition operation and an initial function, such as described in greater detail below in operation 250 of FIG. 2, for example.

The processor 200 may perform the key switching operation based on the key-switching key of which an error is scaled up.

As noted, the memory 300 may store the computer-readable instructions executable by the processor 200.

The memory 300 may include a volatile memory device and/or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Blind rotation operation may be considered an important technology used to perform an operation in RLWE-based homomorphic encryption. For example, a blind rotation operation may typically include storing a function value of each element in a ring in the form of a polynomial, in the form of RLWE homomorphic encryption, and then calculating a learning with errors (LWE) ciphertext for each element with an RGSW ciphertext of vector components of a secret key, thereby finding a desired function value, and may also be used for machine learning by supporting non-linear function operations as well as linear function operations.

However, while typical blind rotation may be used to perform arbitrary function operations on messages of a ciphertext in homomorphic encryption and may provide high accuracy for an operation result, such typical blind rotation of previous bootstrapping approaches may require a lot of memory space to store a public key for operation. In particular, in the case of RLWE-based homomorphic encryption, since the size and the operation speed of an RGSW ciphertext are inversely proportional, when the size of the RGSW ciphertext is large, the operation or computational speed may be significantly slowed down, resulting in long execution times.

In an example, as will be described in greater detail below, the computing apparatus 10 may reduce a dimension of a ciphertext through a key switching operation, and a blind rotation operation may be performed on the reduced dimension ciphertext using a correspondingly generated operation key, thereby reducing the amount of computation of the example blind rotation and the size of the operation key compared to previous approaches.

Figure 1B:
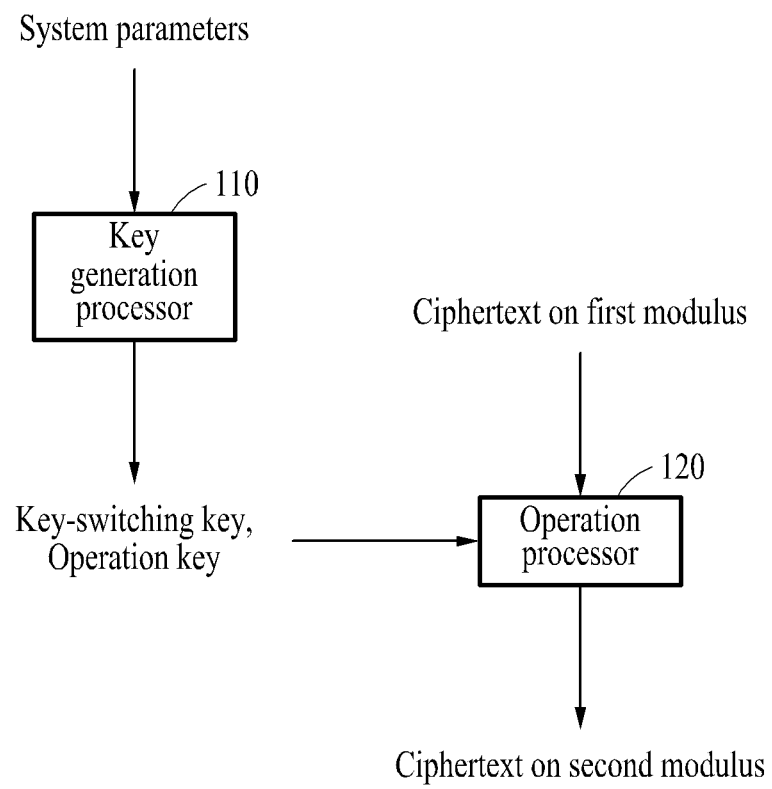
FIG. 1B illustrates an example method with homomorphic encryption, according to one or more embodiments.

FIG. 1B illustrates an example method with homomorphic encryption, according to one or more embodiments.

Referring to FIG. 1B, a homomorphic encryption operation method may be performed by a key generation processor 110 and an operation processor 120. A computing apparatus (e.g., the computing apparatus 10 of FIG. 1A) may include both the key generation processor 110 and the operation processor 120 (e.g., as separate processors represented by the processor 200 of the computing apparatus 10 of FIG. 1A, as separate processing units of a same processor 200, or as separate operations performed by one or more of the processors 200 some or all of which may also perform other operations of the computing apparatus 10). In an example, the computing apparatus may not include the key generation processor 110 but may include the operation processor 120 among one or more processors of the computing apparatus (e.g., among one or more processors that include one or more processors 200 of FIG. 1A), and the key generation processor 110 may be included in a separate terminal (e.g., a corresponding processing unit of a processor of another computing apparatus 10 or as an operation performed by one or more processors, such as the one or more processors 200 of the other computing apparatus). The separate terminal may not include the operation processor 120 but may include the key generation processor 110 among other processors of the separate terminal, or may include both a corresponding operation processor 120 and the key generation processor 110. Each of the key generation processor 110 and the operation processor 120 are also representative of one or more processors and one or memories, which may store respective instructions that when executed by the key generation processor 110 and the operation processor 120 respectively configure the key generation processor 110 and the operation processor 120 to perform one or more or all of the corresponding operations described herein, e.g., respectively to generate the key switching and operation keys and to perform the key switching and blind rotation, as non-limiting examples. Such instructions may also be stored in the memory 300 of the computing apparatus 10 of FIG. 1A. In an example, the computing apparatus 10 including the operation processor 120 may operate as a server, and the terminal (e.g., the other computing apparatus 10) including the key generation processor 110 may operate as a client.

Modulus q, modulus Q of an output ciphertext, and an order N of a polynomial used as an example below may all satisfy 2N|q as a power of 2.

The key generation processor 110 may generate a key-switching key and an operation key by receiving system parameters. The key generation processor 110 may receive the system parameters as input and generate and store a secret key vector (e.g., $\vec{s}=(s_0, \ldots, s_{N-1})$) in the size of N and a secret key vector (e.g., $\vec{z}=\{z_0, \ldots, z_{N'-1}\}$) in the size of N'. The key generation processor 110 may generate a key-switching key for changing the secret key vector (e.g., $\vec{s}=(s_0, \ldots, s_{N-1})$) in the size of N to the secret key vector (e.g., $\vec{z}=\{z_0, \ldots, z_{N'-1}\}$) in the size of N'.

For example, the key generation processor 110 may receive the secret key vectors (e.g., $\vec{s}=(s_0, \ldots, s_{N-1})$ and $\vec{z}=\{z_0, \ldots, z_{N'-1}\}$) as input and scale up the secret key vector (e.g., $s_i$) in the size of N by an arbitrary A. After an operation of making sure that messages are not affected by key switching errors in the course of future key switching operations, a key-switching key (e.g., $KSK_{\vec{s} \to \vec{z}} = \{LWE_{\vec{z},2N}(A \cdot s_i)\}_{i=0}^{N-1} = \{(\vec{a}_i, b_i = -(\langle \vec{a}_i, \vec{z} \rangle + A \cdot s_i + e_i)\}_{i=0}^{N-1})$ may be generated.

Furthermore, the key generation processor 110 may generate an operation key dependent on the secret key vector in the size of N'.

In previous approaches, the operation key for a blind rotation in bootstrapping operations would be generated to correspond to $\vec{s} \in \{-1, 0, 1\}^N$.

Rather, in various example, a blind rotation operation for $LWE_{\vec{z},2N}(u_i) = (\vec{a}=(a_0, \ldots, a_j, \ldots, a_{N'-1}), b)$ corresponds to performing decryption $b + \langle \vec{a}, \vec{z} \rangle = u_i + e_i$ on the exponent, with z having less parameters than $\vec{s}$, for example.

For example, the key generation processor 110 may generate an operation key (e.g., $brk^{*+} = \{RGSW_{s,Q}(s_i^+), RGSW_{s,Q}(s_i^-)\}_{i=0}^{N'-1}$) corresponding to $\vec{z} \in \{-1, 0, 1\}^{N'}$. In this example, $s^+$ and $s^-$ may be expressed by Equation 1 below.

$$s^+ = \begin{cases} 1 & \text{if } z_i = 1 \\ 0 & \text{otherwise} \end{cases}, \quad \text{Equation 1}$$

-continued $$s_i^- = \begin{cases} 1 & \text{if } z_i = -1 \\ 0 & \text{otherwise} \end{cases}$$

Through Equation 1, the number 2N of operation keys in previous approaches can be reduced to 2N' in example blind rotation operations herein, and comparted to the inner loop process of such previous blind rotation operation approaches that are repeated N times for all j, an inner loop process of various examples herein may be repeated only N' times, so the number of operations within the inner loop process may be reduced in various examples compared to such previous approaches.

The key generation processor 110 may transfer the generated key-switching key and operation key to the operation processor 120. The operation processor 120 may perform a bootstrapping operation using a given ciphertext and a public key.

For example, the operation processor 120 may receive a ciphertext (e.g., $RLWE_{s,q}(m)$) on a first modulus (e.g., modulus q), a key-switching key (e.g., $KSK_{\vec{s} \to \vec{z}}$)), and an operation key (e.g., brk* in the size of 2N') as inputs, and perform a homomorphic rounding operation, extract operation, key switching operation, blind rotation operation, repacking operation, and combination operation to output a ciphertext (e.g., $RLWE_{s,Q}(m)$) on a second modulus (e.g., Q). Here, the second modulus may have a value greater than the first modulus (e.g., q≪Q).

Compared to the previous bootstrapping approaches, the operation processor 120 may use more key switching operations, but the total execution time may be reduced compared to the total execution times of the previous bootstrapping approaches since the loop operation repeated inside the corresponding blind rotations of the previous bootstrapping approaches is much more complex and requires more computations than the additional key switching operation performed in various examples herein.

Figure 2:
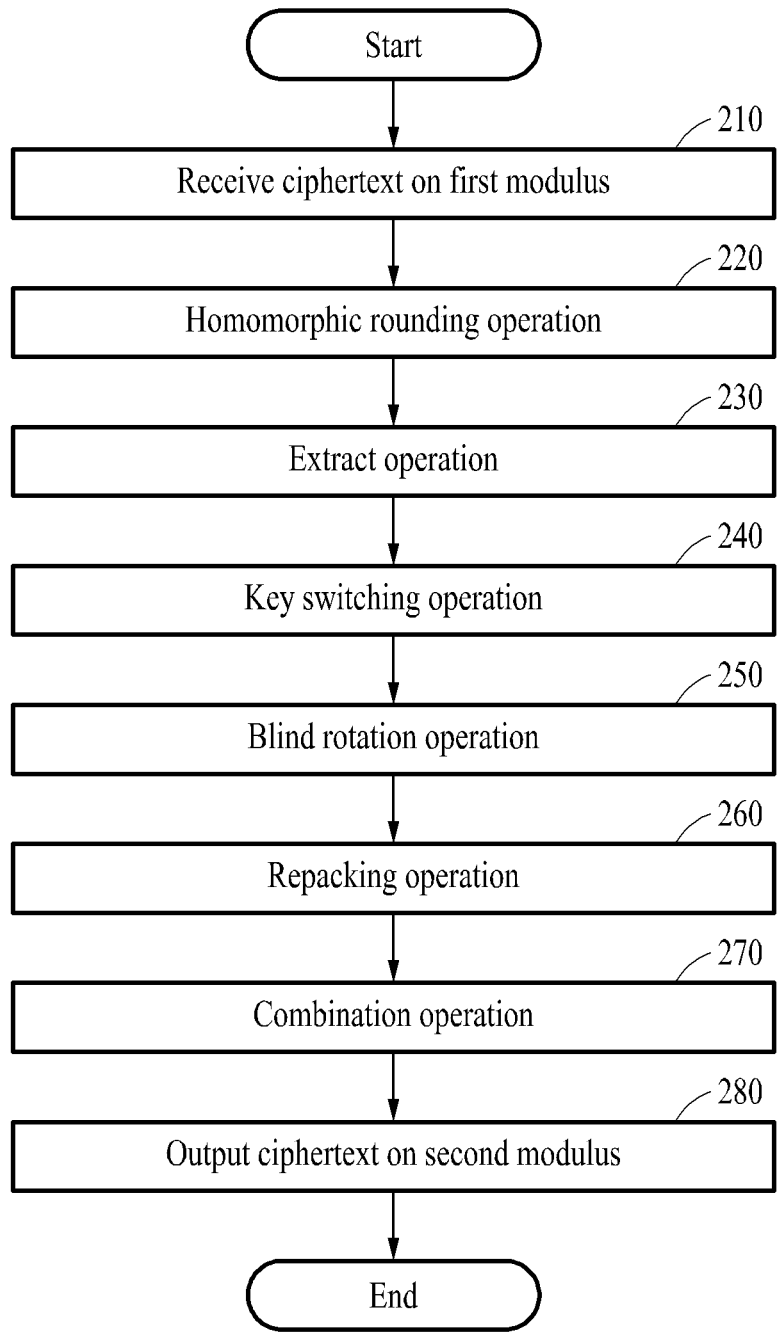
FIG. 2 illustrates an example computing apparatus with homomorphic encryption, according to one or more embodiments.

FIG. 2 illustrates an example computing apparatus with homomorphic encryption, according to one or more embodiments.

Referring to FIG. 2, in operation 210, the computing apparatus (e.g., the computing apparatus 10 of FIG. 1A) may receive a ciphertext in a polynomial form $RLWE_{s,q}(m)$ on modulus q.

In operation 220, the computing apparatus may generate a ciphertext in the polynomial form $RLWE_{s,q'}(m)$ on modulus q'=q/2N and a ciphertext $RLWE_{s,2N}^0(-u)$, in the polynomial form, without errors on modulus 2N by performing a homomorphic rounding operation on the received ciphertext $RLWE_{s,q}(m)$ on modulus q.

In operation 230, the computing apparatus may perform an extract operation to generate a ciphertext in a vector form $\{LWE_{\vec{s},2N}^0(-u_i)\}_{i=0}^{N-1}$, which may for example be understood to be a ciphertext without errors, from the ciphertext in the polynomial form $RLWE_{s,2N}^0(-u)$. Here, $u_i$ corresponds to each coefficient of polynomial $u=u_0+u_1 X + \ldots + u_{(N-1)} X^{(N-1)}$.

In operation 240, the computing apparatus may perform a key switching operation. The computing apparatus may perform a key switching operation on each ciphertext of $\{LWE_{\vec{s},2N}^0(-u_i)\}_{i=0}^{N-1}$ encrypted with $\vec{s}=(s_0, \ldots, s_{N-1})$ using a key-switching key $KSK_{\vec{s} \to \vec{z}}=\{LWE_{\vec{z},2N}(\Delta \cdot s_i)\}_{i=0}^{N-1}$ to generate $\{LWE_{-\vec{z},2N}^0(-\Delta \cdot u_i)\}_{i=0}^{N-1}$ encrypted with $\vec{z}=(z_0, \ldots, z_{N'-1})$. In this process, the dimension of $\vec{z}=(z_0, \ldots, z_{N'-1})$ is N', while the original dimension of $s=(s_0, \ldots, s_{N-1})$ is N. For example, N' may be less than N, such that the subsequent operation 250 of performing the blind rotation may only need to be repeated N' times compared to a previous approach where a previous blind rotation would be performed N times, and thus, less computations may be performed in the below example blind rotation operation 250 compared to a previous blind rotation approach.

Accordingly, in operation 250, the computing apparatus may perform the example blind rotation operation. The computing apparatus may repeat a process of multiplying and adding each of elements ($a_0, \ldots a_j, \ldots, a_{N'-1}$) of the ciphertext $LWE_{\vec{z},2N}(-u_i)=(\vec{a},b)$ with an operation key in the polynomial form brk=$\{RGSW_{s,Q}(s_i^+), RGSW_{s,Q}(s_i^-)\}_{i=0}^{N'-1}$ for a total of N' times for all j, and obtain $RLWE_{s,Q}(-q' \cdot u_i)$ by sequentially multiplying the obtained values from each repeated process by an initial function $f'(X)=\sum_{\ell'=0}^{2B-1} \sum_{k=-c}^{c} q' \cdot k \cdot X^{\Delta \cdot k + \ell'}$.

Because of the key switching operation 240 (e.g., using the key-switching key $KSK_{\vec{s} \to \vec{z}}=\{LWE_{\vec{z},2N}(\Delta \cdot s_i)\}_{i=0}^{N-1}$), which is not performed in previous bootstrapping approaches, messages of a ciphertext (e.g., of the extracted $\{LWE_{\vec{s},2N}^0(-u_i)\}_{i=0}^{N-1}$) may be scaled up by $\Delta$, and the key-switching key applied to $LWE_{\vec{s},2N}^0(-\Delta \cdot u_i)$, may generate LWE ciphertext $LWE_{\vec{z},2N}(-\Delta \cdot u_i)$. For example, compared to previous approaches where a blind rotation may be performed on an extracted $LWE_{\vec{s},2N}^0(-u_i)$, which may be understood to not include errors, the key switching operation 240 generates errors. Accordingly, the computing apparatus may adjust the initial function that is applied during the blind rotation operation 250 to compensate for the added error from the key-switching operation 240. For example, compared to previous approaches where the initial function is typically $f(X)=-\sum_{k=-c}^{c} q' \cdot k \cdot X^k$ in a form without errors within a small boundary of $-c < u_i < c$, when the messages are scaled up in various examples by $\Delta$ before the key-switching operation 240, resulting in the boundary being expanded to $$-\frac{N}{2} < \Delta \cdot u_i < \frac{N}{2}$$

after the key switching operation 240, the result of the blind rotation may be inaccurate due to such generated errors. Thus, the computing apparatus may set the initial function to reflect coefficients according to the expanded error boundary, such as the above $f'(X)=-\sum_{\ell'=0}^{2B-1}=\sum_{k=-c}^{c} q' \cdot k \cdot X^{\Delta \cdot k + \ell'}$. B in the initial function may denote a boundary of an error generated due to the key switching operation.)

The homomorphic encryption operation apparatus may obtain $\{RLWE_{s,Q}(-q' \cdot u_i)\}_{i=0}^{ns-1}$ by repeating the above-described process for all $u_i$ as much as the number ns of the message slots.

In operation 260, the computing apparatus may perform a repacking operation, where the ns ciphertext polynomials $\{RLWE_{s,Q}(-q' \cdot u_i)\}_{i=0}^{ns-1}$ may be combined into one ciphertext polynomial $RLWE_{s,Q}(-q' \cdot u)$ through polynomial coefficients Rotation and Negation, and Addition.

In operation 270, the computing apparatus may perform a combination operation, where the ciphertext $RLWE_{s,q'}(m)$ generated in operation 220 may be expressed as a ciphertext $RLWE_{s,Q}(m+q' \cdot u)$ on a modulus Q, and the ciphertext $RLWE_{s,Q}(m+q' \cdot u)$ may be added to the ciphertext RLWE$_{s,Q}$(−q'·u) that results from the blind rotation operation 260, to generate a final ciphertext RLWE$_{s,Q}$(m) on modulus Q (q≪Q).

In operation 280, the ciphertext RLWE$_{s,Q}$(m) on modulus may be output as the result of the bootstrapping.

Figure 3A:
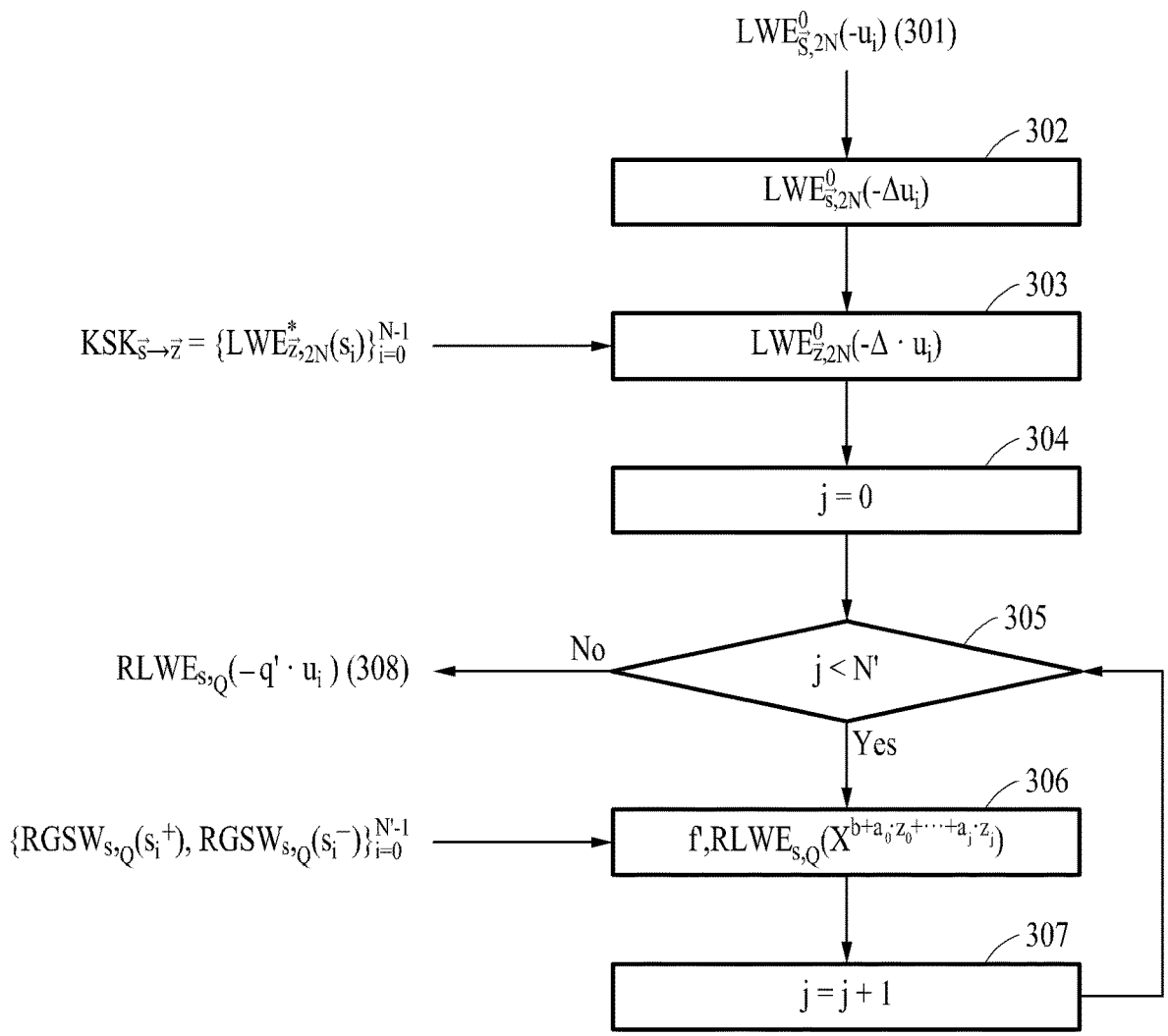
FIGS. 3A to 3B illustrate example methods of performing blind rotation, according to various embodiments.

FIG. 3A illustrates an example method of performing an example blind rotation, according to one or more embodiments.

Referring to FIG. 3A, a computing apparatus (e.g., the computing apparatus 10 of FIG. 1A) may receive LWE$_{\vec{s},2N}^{0}$(−u$_i$) in operation 301, and upscale u$_i$ by an arbitrary A in operation 302.

In operation 303, the computing apparatus may perform a key switching operation using a key-switching key KSK$_{\vec{s} \to \vec{z}}$={LWE$_{\vec{z},2N}$(Δ·s$_i$)}$_{i=0}^{N-1}$ to generate {LWE$_{\vec{z},2N}^{0}$(−Δ·u$_i$)}$_{i=0}^{N-1}$ encrypted with $\vec{z}$=(z$_0$, . . . , z$_{N-1}$).

In operation 304, the computing apparatus may set j as 0 and repeat operations 305 to 307, i.e., repeat, for a total of N' times for all j, operation 306 that includes multiplying and adding each of elements (a$_0$, . . . a$_j$, . . . , a$_{N'-1}$) of a ciphertext LWE$_{\vec{z},2N}$(−u$_i$)=($\vec{a}$,b) with an operation key brk={RGSW$_{s,Q}$(s$_i^+$),RGSW$_{s,Q}$(s$_i^-$)}$_{i=0}^{N'-1}$, which is a polynomial form, and obtain RLWE$_{s,Q}$(−q'·u$_i$) in operation 308 by sequentially multiplying each of obtained values from operation 306 by an initial function f'(X)=−$\sum_{\ell=0}^{2B-1}\sum_{k=-c}^{c}$q'·k·X$^{\Delta \cdot k+\ell}$ in operation 308.

Figure 3B:
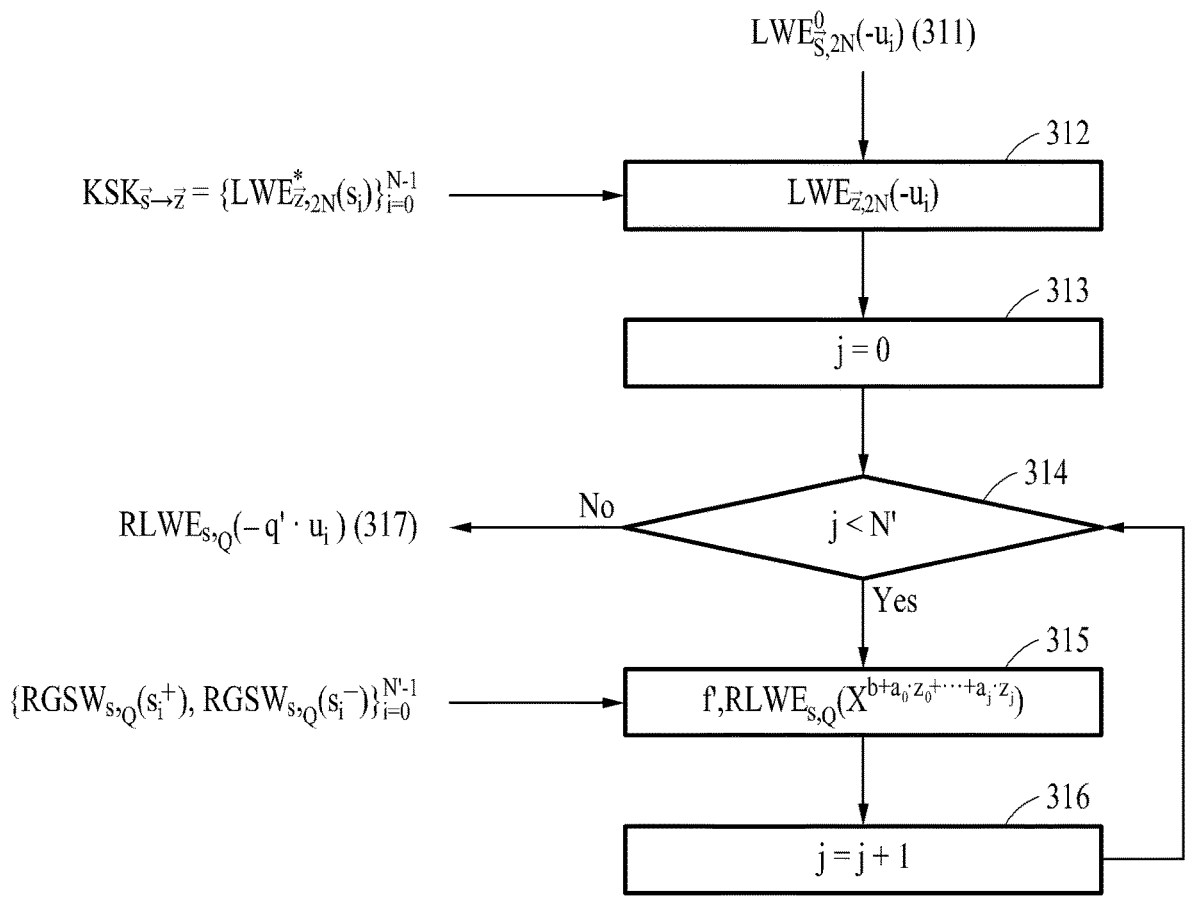

FIG. 3B illustrates an example method of performing an example blind rotation, according to one or more embodiments.

A computing apparatus (e.g., the computing apparatus 10 of FIG. 1A) may scale up an error as shown in Equation 2 below, instead of scaling up a secret key in a process of generating a key-switching key such as performed in the example of FIG. 3A, so that an error generated by a key switching operation does not affect a message.

$$LWE_{\vec{z}}^{*}(s_i) = (\vec{a}_i, b_i) = -\langle\vec{a}, \vec{z}\rangle + s_i + \Delta \cdot e_i) \quad \text{Equation 2}$$

For example, the key generation processor may receive secret key vectors s=(s$_0$, . . . , s$_{N-1}$) and $\vec{z}$={z$_0$, . . . , z$_{N'-1}$} as input and generate a key-switching key KSK$_{\vec{s} \to \vec{z}}$={LWE$_{\vec{z},2N}^{*}$(s$_i$)}$_{i=0}^{N-1}$={($\vec{a}_i$,b$_i$)=−⟨$\vec{a}$,$\vec{z}$⟩+s$_i$+Δ·e$_i$)}$_{i=0}^{N-1}$.

In operation 311, the computing apparatus may receive LWE$_{\vec{s},2N}$(−u$_i$), and in operation 312 the computing apparatus may generate a ciphertext {LWE$_{\vec{z},2N}$(−u$_i$)}$_{i=0}^{N-1}$ encrypted with $\vec{z}$=(z$_0$, . . . , z$_{N'-1}$) by performing a key switching operation using KSK$_{\vec{s} \to \vec{z}}$={LWE$_{\vec{z},2N}^{*}$(s$_i$)}$_{i=0}^{N-1}$.

In operation 313, the computing apparatus may set j as 0 and repeat operations 314 to 316, repeat, for a total of N' times for all j, operation 315 that includes the process of multiplying and adding each of elements (a$_0$, . . . a$_j$, . . . , a$_{N'-1}$) of a ciphertext LWE$_{\vec{z},2N}$(−u$_i$)=($\vec{a}$,b) with an operation key brk={RGSW$_{s,Q}$(s$_i^+$),RGSW$_{s,Q}$(s$_i^-$)}$_{i=0}^{N'-1}$, which is a polynomial form, and obtain RLWE$_{s,Q}$(−q'·u$_i$) in operation 317 by sequentially multiplying each of the obtained values from operation 315 by an initial function f*(X)=−$\sum_{\ell=0}^{2B-1}\sum_{k=-c}^{c}$q'·k·X$^{\Delta \cdot k+\ell}$.

Figure 4:
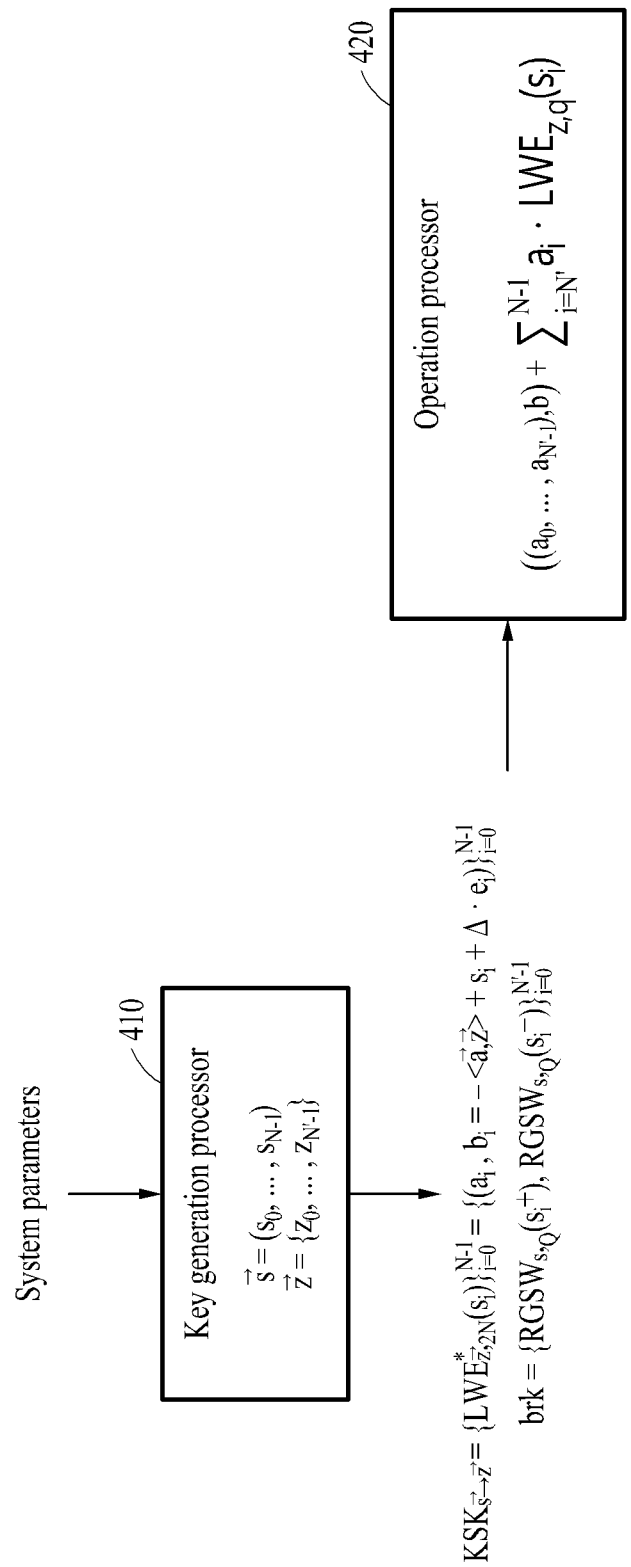
FIG. 4 illustrates an example homomorphic encryption operation performed by a computing apparatus, according to one or more embodiments.

FIG. 4 illustrates an example computing apparatus with homomorphic encryption, according to one or more embodiments.

Referring to FIG. 4, the computing apparatus (e.g., computing apparatus 10 of FIG. 1A) may generate secret key vectors $\vec{s}$ and $\vec{z}$ as correlated values to perform a key switching operation more efficiently as described above.

A key generation processor 410 (e.g., the key generation processor 110 of FIG. 1B) may set $\vec{z}$ as a sub-vector structure of $\vec{s}$. For example, the key generation processor 410 may set $\vec{s}$=(s$_0$, . . . , s$_{N'-1}$, . . . , s$_{N-1}$) and $\vec{z}$=(s$_0$, . . . , s$_{N'-1}$), such that the total number of dimensions of $\vec{z}$ is less than the total number of dimensions of $\vec{s}$. By using a secret key with the structure described above, a key-switching key may be generated only for (s$_{N'}$, . . . , s$_{N-1}$), thereby reducing the size of the key and reducing the amount of computation in the key switching operation process.

For example, an operation processor 420 (e.g., the operation processor 120 of FIG. 1B) may perform a key switching operation as shown in Equation 3 based on a key-switching key KSK$_{\vec{s} \to \vec{z}}$={LWE$_{\vec{z},2N}$(s$_i$)}$_{i=N'}^{N-1}$.

$$((a_0, \ldots, a_{N'-1}), b) + \sum_{i=N'}^{N-1} a_i \cdot LWE_{\vec{z},q}(s_i) \quad \text{Equation 3}$$

If a typical key switching operation were performed with respect to a hypothetical ciphertext {LWE'$_{\vec{s},2N}^{0}$(−u$_i$)}$_{i=0}^{N-1}$, e.g., such as if the hypothetical ciphertext was extracted from a result of a homomorphic rounding operation performed on a hypothetical ciphertext RLWE'$_{s,q}$(m), the typical key switching operation may be performed according to below Equation 4 with respect to the hypothetical key-switching key KSK$_{\vec{s} \to \vec{z}}$={LWE'$_{\vec{z}',2N}$(s$_i$)}$_{i=0}^{N-1}$, where $\vec{z}'$={z'$_0$, . . . , z'$_{N-1}$}.

$$(\vec{0}, b) + \sum_{i=0}^{N-1} a_i \cdot LWE'_{\vec{z}',q}(s_i) = LWE'_{\vec{z}'}\left(b + \sum_{i=0}^{N-1} a_i \cdot s_i\right) = LWE'_{\vec{z}',q}(m) \quad \text{Equation 4}$$

However, for examples herein where the key switching operation is performed in the bootstrapping operation, e.g., with respect to N' instead of N, the corresponding Equation 5 below may be derived from a separation of the summations in Equation 4.

$$(0, b) + \sum_{i=0}^{N'-1} a_i \cdot LWE_{\vec{z},q}(s_i) \sum_{i=0}^{N-1} a_i \cdot LWE_{\vec{z},q}(s_i) \quad \text{Equation 5}$$

In Equation 5, s$_i$ with respect to i=0, . . . , N'−1 is an element constituting $\vec{z}$=(s$_0$, . . . , s$_{N'-1}$), so when (1)$_i$ is a vector of which an i-th element is 1, LWE$_{\vec{z},q}$(s$_i$) may be simply expressed as ((1)$_i$,0), as shown in Equation 6 below. This corresponds to an LWE ciphertext without random value and errors through which the desired s$_i$ may be obtained when a dot product operation is performed with $\vec{z}$.

Equation 6

$$(1)_0 \cdot \vec{z} + 0 = (1, 0, \ldots, 0) \cdot \vec{z} = (1, 0, \ldots, 0) \cdot (s_0, \ldots, s_{N'-1}) = s_0$$

$$(1)_1 \cdot \vec{z} + 0 = (0, 1, \ldots, 0) \cdot \vec{z} = (0, 1, \ldots, 0) \cdot (s_0, \ldots, s_{N'-1}) = s_1$$

$$\vdots$$

$$(1)_{N'-1} \cdot \vec{z} + 0 = (0, 0, \ldots, 1) \cdot \vec{z} = (0, 0, \ldots, 1) \cdot (s_0, \ldots, s_{N'-1}) = s_{N'-1}$$

Therefore, Equation 5 may alternatively be expressed as Equation 7.

Equation 7

$$(0, b) + \sum_{i=0}^{N'-1} a_i \cdot ((1)_i 0) + \sum_{i=N'}^{N-1} a_i \cdot LWE_{\vec{z},q}(s_i) =$$

$$((a_0, \ldots, a_{N'-1}), b) + \sum_{i=N'}^{N-1} a_i \cdot LWE_{\vec{z},q}(s_i)$$

Thus, in various examples, $\vec{s} = (s_0, \ldots, s_{N'-1}, \ldots, s_{N-1})$ and $\vec{z} = (s_0, \ldots, s_{N'-1})$ may be set according to Equation 7, such that while blind rotation with respect to $a_i$ would typically have been performed N times in the previous blind rotation approaches, in various examples herein the multiplication operation with the LWE ciphertext may be reduced to N–N' times, and the key-switching key that is utilized may also be reduced from N LWE ciphertexts to N–N' LWE ciphertexts such as $KSK_{\vec{s} \to \vec{z}} = \{LWE_{\vec{z},2N}(s_i)\}_{i=N'}^{N-1}$.

Figure 5:
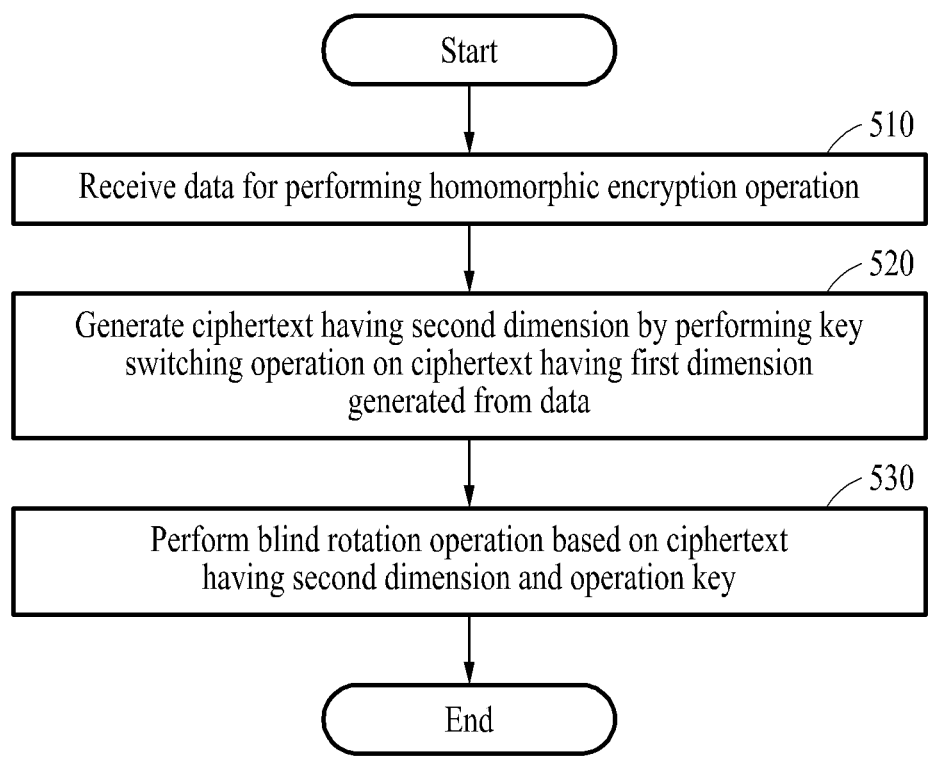
FIG. 5 illustrates an example method with homomorphic encryption, according to one or more embodiments.

FIG. 5 illustrates an example method with homomorphic encryption, according to one or more embodiments.

For ease of description, in an example, operations 510 to 530 will be described as being performed by a computing apparatus (e.g., the computing apparatus 10 of FIG. 1A). However, in various other examples, operations 510 to 530 may be performed by other suitable electronic devices in suitable systems.

Respective portions of different operations shown in FIG. 5 may be performed in parallel or simultaneously.

Referring to FIG. 5, in operation 510, the computing apparatus may receive data for performing a homomorphic encryption operation. The computing apparatus may receive a key-switching key and an operation key from a key generation processor.

In operation 520, the computing apparatus may generate a ciphertext having a second dimension by performing a key switching operation on a ciphertext having a first dimension generated from the data. The second dimension may have a value smaller than the first dimension.

For example, the computing apparatus may perform a homomorphic rounding operation on an RLWE ciphertext having the first dimension to generate an LWE ciphertext having the first dimension based on a result of the homomorphic rounding operation.

The computing apparatus may then perform the key switching operation based on a key-switching key in which a secret key of the ciphertext having the first dimension is scaled up, such as by applying a scaling factor Δ to the secret key. Alternatively, the computing apparatus may perform the key switching operation based on a key-switching key in which an error is scaled up, such as by applying a scaling factor Δ to error.

In operation 530, the computing apparatus may perform a blind rotation operation based on the operation key and the ciphertext (e.g., the LWE ciphertext) having the second dimension to generate the RLWE ciphertext on a second modulus. The operation key may be determined based on the secret key of the ciphertext having the second dimension. The second modulus may have a value greater than the first modulus.

Figure 6:
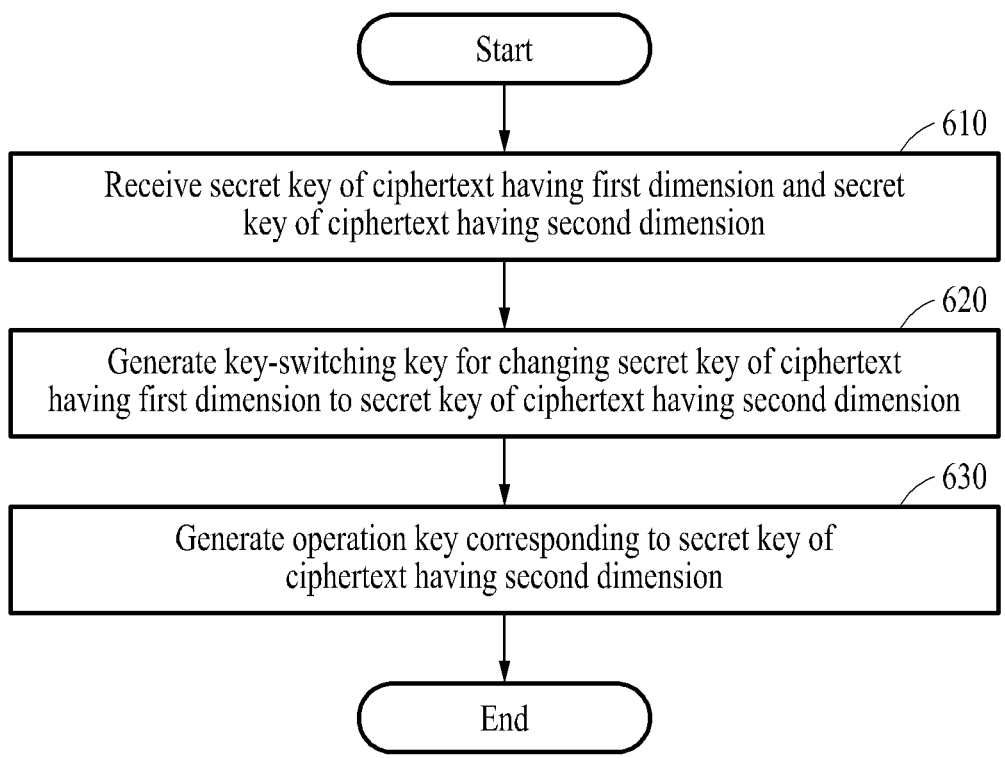
FIG. 6 illustrates an example method with homomorphic encryption, according to one or more embodiments.

FIG. 6 illustrates an example method with homomorphic encryption, according to one or more embodiments.

For ease of description, in an example, operations 610 to 630 will be described as being performed by a key generation processor (e.g., the key generation processor 110 of FIG. 1B). However, in various examples, operations 610 to 630 may be performed by other suitable electronic devices in suitable systems.

Respective portions of different operations shown in FIG. 6 may be performed in parallel or simultaneously.

Referring to FIG. 6, in operation 610, the key generation processor may receive a secret key of a ciphertext having a first dimension and a secret key of a ciphertext having a second dimension.

In operation 620, the key generation processor may generate a key-switching key for changing the secret key of the ciphertext having the first dimension to the secret key of the ciphertext having the second dimension. The key generation processor may scale up the secret key of the ciphertext having the first dimension, e.g., by applying a scaling factor Δ to this secret key, and generate the key-switching key based on a result of the scale-up secret key. Alternatively, the key generation processor may scale up an error used to generate the key-switching key, e.g., by applying a scaling factor Δ to the error, and generate the key-switching key based on the scale-up error.

In operation 630, the key generation processor may generate an operation key corresponding to the secret key of the ciphertext having the second dimension.

The key generation processor may then provide the generated key-switching key and operation key to the processor of the computing apparatus (e.g., the processor 200 of the computing apparatus 10 of FIG. 1A), an operation processor (e.g., the operation processor 120 of FIG. 1B) of the computing apparatus, to another computing apparatus (e.g., the processor 200 of the other computing apparatus 10) or an operation processor 120 of the other computing apparatus. The computing apparatus may also provide the ciphertext having the first dimension and the corresponding secret key to the other computing apparatus, or the other computing apparatus may receive or obtain the ciphertext having the first dimension and the corresponding secret key from still another computing apparatus (e.g., another computing apparatus 10). In an example, operations of FIG. 5 may be performed after the operations of FIG. 6.

The computing apparatuses, the computing apparatus 10, the receiver 100, the processors, the processor 200, the memories, the memory 300, the key generation processors, the key generation processor 110, the operation processors, and the operation processor 120, described herein, including descriptions with respect to respect to FIGS. 1-6, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-6 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method for performing a homomorphic encryption operation, the method comprising:
generating a second ciphertext, having a second total number of dimensions, by performing a key switching operation using a key-switching key to generate the second ciphertext, encrypted by a second secret key, based on a homomorphic encrypted first ciphertext on a first modulus encrypted by a first secret key, where the first ciphertext has a first total number of dimensions; and
generating a ciphertext on a second modulus by performing a blind rotation operation based on the second ciphertext and an operation key.

2. The method of claim 1, wherein the second total number of dimensions is less than the first total number of dimensions, and the second modulus is greater than the first modulus.

3. The method of claim 1, wherein the key-switching key is based on a scaled up version of the first secret key.

4. The method of claim 3, wherein the performing of the blind rotation operation comprises:
generating a result of a summation of respective products of each element of the second ciphertext and the operation key; and
generating a result of a product of the result of the summation and an initial function that is determined based on the key-switching key.

5. The method of claim 1, wherein the key switching key is based on a scaled up error corresponding to the key switching operation.

6. The method of claim 1, wherein the second secret key is a sub-vector of the first secret key.

7. The method of claim 1, further comprising receiving the key-switching key, the operation key which is dependent on the second secret key, and a ring learning with errors (RLWE) ciphertext as the first ciphertext,
wherein the RLWE ciphertext corresponds to the RLWE ciphertext having been generated from data set for performing a homomorphic encryption operation.

8. The method of claim 7,
wherein the second ciphertext is a second learning with errors (LWE) ciphertext,
wherein the method further comprises:
performing a homomorphic rounding operation on the RLWE ciphertext; and
generating a first LWE ciphertext having the first total number of dimensions based on a result of the homomorphic rounding operation, and
wherein the generating of the second ciphertext comprises generating the second ciphertext by performing the key switching operation on the first LWE ciphertext.

9. The method of claim 8,
wherein the ciphertext on the second modulus is a RLWE ciphertext, and
wherein the second modulus is greater than the first modulus.

10. A non-transitory computer-readable storage medium storing instructions that, when executed by a processor, configure the processor to perform the method of claim 1.

11. A processor-implemented method for homomorphic encryption, the method comprising:
receiving a first secret key of a first ciphertext having a first total number of dimensions and a second secret key for a second ciphertext having a second total number of dimensions less than the first total number of dimensions;
generating a key-switching key configured to generate the second ciphertext based on the first ciphertext and the first secret key;
generating an operation key, based on the second secret key, configured to generate bootstrapping blind rotation results with respect to a homomorphic encryption operation that is dependent on the key-switching key; and
outputting the key-switching key and the operation key.

12. The method of claim 11, wherein the generating of the key-switching key comprises:
scaling up the first secret key; and
generating the key-switching key based on the scaled up first secret key.

13. The method of claim 11, wherein the generating of the key-switching key comprises:
scaling up an error used corresponding to a use of the key-switching key to perform a key-switching operation; and
generating the key-switching key based on the scaled up error.

14. An apparatus, the apparatus comprising:
a processor configured to:
generate a second ciphertext, having a second total number of dimensions, through performance of a key switching operation that uses a key-switching key to generate the second ciphertext, encrypted by a second secret key, based on a homomorphic encrypted first ciphertext on a first modulus encrypted by a first secret key, where the first ciphertext has a first total number of dimensions; and
generate a ciphertext on a second modulus by performing a blind rotation operation based on the second ciphertext and an operation key.

15. The apparatus of claim 14, wherein the second total number of dimensions is less than the first total number of dimensions, and the second modulus is greater than the first modulus.

16. The apparatus of claim 14, wherein the key-switching key is based on a scaled up version of the first secret key.

17. The apparatus of claim 16, wherein, for the performing of the blind rotation operation, the processor is further configured to:
generate a result of a summation of respective products of each element of the second ciphertext and the operation key; and
generate a result of a product of the result of the summation and an initial function that is determined based on the key-switching key.

18. The apparatus of claim 14, wherein the key switching key is based on a scaled up error corresponding to the key switching operation.

19. The apparatus of claim 14, wherein the second secret key is a sub-vector of the first secret key.

20. The apparatus of claim 14, further comprising a receiver to receive the key-switching key, the operation key which is dependent on the second secret key, and a ring learning with errors (RLWE) ciphertext on the first modulus as the first ciphertext,
wherein the second ciphertext is a second learning with errors (LWE) ciphertext,
wherein the processor is further configured to:
perform a homomorphic rounding operation on the RLWE ciphertext; and generate a first LWE ciphertext having the first total number of dimensions based on a result of the homomorphic rounding operation, and wherein, for the generation of the second ciphertext, the processor is configured to generate the second ciphertext through performance of the key switching operation on the first LWE ciphertext.

\* \* \* \* \*